United States Patent [19]

Koike et al.

[11] Patent Number: 5,439,495
[45] Date of Patent: Aug. 8, 1995

[54] SOLUTION DOPING OF SOL GEL BODIES TO MAKE GRADED INDEX GLASS ARTICLES

[75] Inventors: Hisashi Koike, Machida; Morinao Fukuoka, Hachiohji; Yuko Kurasawa, Hachiohji; Minoru Inami, Hachiohji; Masayuki Yamane, Yokohama, all of Japan

[73] Assignee: Olympus Optical Co., Ltd., Tokyo, Japan

[21] Appl. No.: 119,735

[22] Filed: Sep. 10, 1993

[30] Foreign Application Priority Data

Sep. 11, 1992 [JP] Japan .................. 4-269487
May 11, 1993 [JP] Japan .................. 5-132958
Jun. 18, 1993 [JP] Japan .................. 5-172188

[51] Int. Cl.$^6$ .................................. C03B 8/00
[52] U.S. Cl. .................... 65/17.2; 65/31; 65/901; 501/12
[58] Field of Search ............. 501/12; 65/18.3, 901, 65/31, 18.1, 17.2, 395, 399

[56] References Cited

U.S. PATENT DOCUMENTS

| | | | |
|---|---|---|---|
| 4,389,233 | 6/1983 | Kurosaki | 65/901 |
| 5,069,700 | 12/1991 | Yamane | 65/18.3 |
| 5,123,940 | 6/1992 | DiGiovanni | 65/901 |
| 5,171,344 | 12/1992 | Noda | 65/901 |
| 5,192,351 | 3/1993 | Mathur | 65/901 |
| 5,246,475 | 9/1993 | Edagawa | 65/901 |
| 5,254,148 | 10/1993 | Inami | 65/18.3 |
| 5,294,573 | 3/1994 | Haun | 501/12 |
| 5,308,802 | 5/1994 | Haun | 501/12 |

FOREIGN PATENT DOCUMENTS

| | | | |
|---|---|---|---|
| 129625 | 1/1985 | European Pat. Off. | 65/901 |
| 2084990 | 4/1981 | United Kingdom | 65/901 |

*Primary Examiner*—W. Gary Jones
*Assistant Examiner*—John Hoffmann
*Attorney, Agent, or Firm*—Ostrolenk, Faber, Gerb & Soffen

[57] ABSTRACT

A method for manufacturing a glass is provided, comprising converting a porous body to a multi-component glass, wherein a porous body containing at least one metal component in the form of a metal salt is immersed in a solution containing at least one compound selected from the group consisting of an acid, an ammonium salt and an alkylammonium salt to precipitate the metal salt as microcrystals in the pore. Also, a method for manufacturing a glass for use as a gradient index optical element is provided, comprising converting a porous body to a multi-component glass, wherein a porous body containing at least one metal component in the form of a metal salt is immersed in a solution containing a salt of a metal component different from the above-mentioned at least one component and at least one compound selected from the group consisting of an acid and a salt to provide the metal components with concentration distributions. In these methods, not only the metal salt present in dissolved form in the pores of the porous body can be fixed to the pores with certainty, but also it is feasible to individually control the behaviors of a plurality of metal salts in the porous body.

22 Claims, 10 Drawing Sheets

REFRACTIVE INDEX.

RADIUS

REFRACTIVE INDEX.

RADIUS (mm)

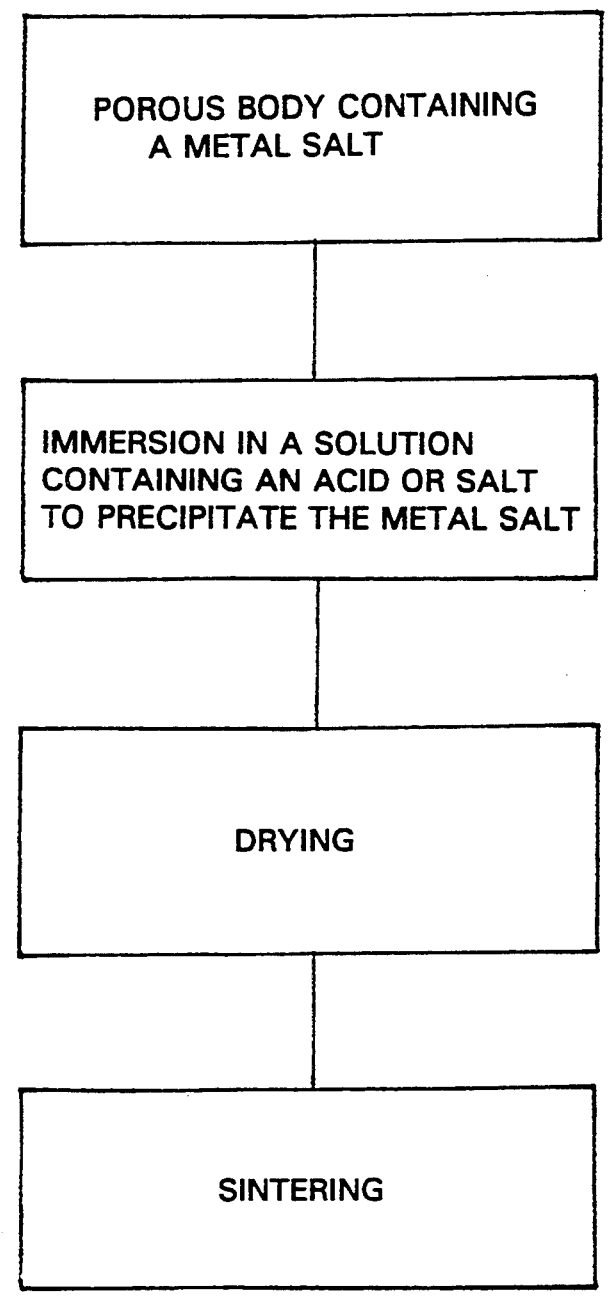
F I G. 13

SOLUTION DOPING OF SOL GEL BODIES TO MAKE GRADED INDEX GLASS ARTICLES

BACKGROUND OF THE INVENTION

1. Field of the Invention

The present invention relates to a method for manufacturing a glass. More particularly, the present invention is concerned with a method for manufacturing, through a porous body, a multi-component glass, especially a glass for use as a gradient index optical element, such as optical lenses for cameras, microscopes and the like.

2. Discussion of Related Art

Various methods have been proposed for manufacturing a multi-component glass from a porous body. For example, the multi-component glass may be manufactured according to the sol-gel method in which use is made of a porous gel produced by subjecting a metal alkoxide to hydrolysis and a polycondensation reaction or a porous gel is produced by dispersing water glass or a particulate of an oxide, such as $SiO_2$, in a solvent to obtain a sol and regulating the pH value of the sol (see Japanese Patent Application Laid-Open Specification No. 277525/1988). Alternatively, the multi-component glass is manufactured by a method in which use is made of a porous glass produced by melting an alkali borosilicate glass, and conducting thermal treatment for phase separation and acid treatment to leach out a soluble phase (see Japanese Patent Application Publication No. 21173/1986). Still alternatively, the multi-component glass is manufactured by a method in which use is made of soot produced by depositing metal oxide particles according to, for example, the CVD technique [see *Hikaligijutsu* Contact (optical technology contact), 28 (1990), 228–232].

In particular, a brief description will be made with respect to the steps for manufacturing, through a porous body, a homogeneous multi-component glass or a glass having a distribution of refractive index, etc. First, a porous body containing a metal component is produced, and the metal component is fixed while it has no concentration distribution. Drying and sintering converts the porous body to a homogeneous glass. If the metal component (ion) is fixed after providing the same with a concentration distribution and then the porous body is dried and sintered, a glass having a distribution of refractive index, etc. results.

The term "fixing" used herein refers to a step of precipitating, as microcrystals, a metal salt present in dissolved form in the pores of a porous body to thereby prevent the moving of the metal salt in the pores. A method utilizing a solubility difference has been employed for the fixing of a metal component in a porous body. In particular, the following procedure has been proposed, depending on the strength and properties of the porous body.

When a phase separation glass is used, it is immersed in an aqueous solution of a metal nitrate, as a dopant, heated at about 100° C. to thereby stuff the pores thereof with the metal nitrate (stuffing step). Subsequently, the glass is immersed in a solution capable of diffusing the metal nitrate (e.g., ethanol/water solution heated at about 70° C.) to gradually leach out the solution containing the dopant metal nitrate outside the phase separation glass (unstuffing step) so that a concentration distribution is provided. The resultant porous body with the concentration distribution is immersed in ethanol kept at about 0° C. in which the solubility of the nitrate is low to precipitate microcrystals in the pores of the porous body so that the concentration distribution is fixed. Thereafter, the porous body is dried and subjected to thermal treatment to obtain a dense glass. With respect to the method for manufacturing a glass with a distribution of refractive index according to the molecular stuffing method as set forth above, reference is made to Japanese Patent Application Publication No. 21173/1986.

Japanese Patent Application Laid-Open Specification No. 277525/1988 proposes a method for manufacturing a glass, comprising preparing a porous gel from a raw material of a solution containing an alkoxide of Si as a major component and a water soluble salt of a specific metal ion and subjecting the porous gel to drying and sintering according to the sol-gel method, wherein the porous gel is immersed in an organic solvent miscible with water, in which the solubility of the metal salt is low, to introduce the metal, thereby obtaining a multi-component glass.

Further, Japanese Patent Application Laid-Open Specification No. 295818/1991 discloses a method for manufacturing a glass body provided with a distribution of refractive index using a metal salt according to the sol-gel method, in which a fixing operation is applied to a porous body.

This method will briefly be described below.

An aqueous solution of lead acetate as a metal component for providing a refractive index distribution (first metal component) is added to a sol prepared using a silicon alkoxide as a raw material for skeleton-forming oxide, thereby producing a cylindrical gel. This gel is successively immersed, for the utilization of a difference in solubility of lead acetate, in solvents each comprising acetone and isopropanol (often referred to as "IPA") in a mixing ratio having staged variation from 0 to 1 to cause staged decrease in the solubility, so that microcrystals of lead acetate are precipitated on the wall of the pores of the gel. Thus, lead acetate is fixed. If the gel is immersed in acetone in which the solubility of lead acetate is low in place of the solvents having a mixing ratio with staged variation, the precipitation of lead acetate is so rapid that crystals grow in the gel to destroy the skeleton of the gel.

Subsequently, the gel is immersed in a distribution-providing solution comprising ethanol and, dissolved therein, potassium acetate as a second metal component for replacing the lead acetate in the gel. In this immersion step, counter diffusion of lead and potassium ions occurs to thereby form a convex profile in the lead acetate concentration in the radial direction and a concave profile in the potassium acetate concentration in the radial direction. The potassium of the second metal component is introduced in a distribution profile reverse to that of lead so that a distributional change of thermal expansion coefficient (often referred to as "α") caused by the concentration distribution of lead is compensated for. The formed distribution profile can be controlled by the period of immersion in the distribution-providing solution, etc. The resultant gel is immersed in solvents each comprising acetone and IPA in a mixing ratio having staged variation to thereby precipitate microcrystals of lead and potassium acetates on the wall of the pores of the gel. Thus, the concentration distributions of the metals are fixed in the skeleton of the gel.

The resultant wet gel is dried and sintered, thereby obtaining an optical element having a refractive index distribution in the radial direction.

With respect to an optical element having a refractive index distribution, i.e., gradient index optical element, it is known that a plurality of metal components must be provided with concentration distributions with combinational concave and convex profiles in order to ensure highly effective optical design (see U.S. Pat. No. 5,166,827).

However, the glasses manufactured by the above-mentioned conventional processes have two major drawbacks.

The first drawback resides in that the fixing of the metal component incorporated in a porous body is not certain, so that a multi-component glass with a desired composition cannot be obtained. This is also true with respect to a glass having a metal component provided with a distribution. That is, the fixing of the provided distribution profile of the metal component is not certain, so that a glass with a desired distribution profile cannot easily be obtained.

The second drawback resides in that, in providing a plurality of metal components with distributions, it is not feasible to individually control the distribution profiles of metal components, so that various characteristics attributed to the distribution of the composition of the glass (e.g., distributions of diffusion and thermal expansion coefficient) cannot be controlled.

These two drawbacks will further be described in greater detail.

Now, the first drawback relating to the fixing of metal components will be described.

In the method using a water soluble metal salt as disclosed in Japanese Patent Application Laid-Open Specification No. 277525/1988, use is made of a salt, such as an acetate, a nitrate and a chloride. When a porous gel is immersed in an organic solvent miscible with water, in which the solubility of the salt is low, in order to fix such a metal component in the porous gel, however, a portion of the metal salt in the porous gel is precipitated as microcrystals and fixed in the pores of the porous gel, as mentioned above, while the rest of the metal salt is leached out from the porous gel, in a form dissolved in the solvent in the pores of the porous gel. The solubility of the metal salt is lower in the organic solvent than in the solvent of the solution in the porous gel, so that the metal salt leached out is precipitated in the organic solvent. In the case where the organic solvent is replaced by a solvent of a type, and with a mixing ratio selected to increase the solubility of the metal salt for the purpose of inhibiting crystal precipitation in the organic solvent, the metal salt is leached out from the porous gel, in a form dissolved in the replacing solvent. Thus, the absolute amount of the metal salt fixed and remaining in the porous gel is decreased.

Introduced metal elements include those, such as rare earth elements, which give an acetate salt having low solubility in water or an alcohol. When an acetate of a rare earth element is employed, the solubility thereof cannot be sufficient so that the acetate cannot be incorporated in the porous gel in a desirably large amount, or that, in previously doping a sol with a metal component according to the sol-gel process, a large amount of solvent is needed so that the sol is excessively diluted. Thus, cracks due to lowered gel strength frequently occur, and hence, it has been difficult to manufacture a glass with a desired morphology.

The acetate may be replaced by a nitrate or a chloride. In the method as disclosed in Japanese Patent Application Laid-Open Specification No. 277525/1988, the porous body is immersed in an organic solvent miscible with water to precipitate and fix microcrystals. In the immersion of a nitrate or a chloride in an organic solvent in which the solubility of the salt is appropriate, a portion of the salt is fixed, while the rest is leached into the immersion solvent. Thus, it is difficult to completely fix the metal salt in the porous body, so that the manufacturing of a glass with a desired composition has been difficult.

That is, with respect to rare earth elements and other metal species for which the use of a nitrate, a chloride or the like is inevitable, it has been unfeasible to effect fixing while a desirably large amount of metal remains in the gel irrespective of the use of the type of employed solvent (although the degree of crystal precipitation depends on the type of immersion solvent), as long as the conventional technology is employed.

Further, the step which is inevitable in the manufacturing of a gradient index optical element according to the method proposed in Japanese Patent Application Laid-Open Specification No. 295818/1991, etc., is one for providing the lead acetate in a porous gel with a concentration distribution. However, as mentioned above, a portion of the lead acetate is present as microcrystals in the pores of the porous gel, while the rest is present in the pores in a form dissolved in the distribution-providing solution, in the distribution-providing step. The provision of the distribution is governed by the permeation of the distribution-providing solution into the porous gel and by the mutual dissolution and counter diffusion of lead and potassium acetates. At this stage, it is believed that the distribution profile of lead acetate is as shown in FIG. 1, has neither extremum nor inflection point in the radial direction, and exhibits a monotonous decline from the center toward the periphery. When such a wet gel is immersed in a solution in which the solubility of lead acetate is low, the lead acetate in the pores is gradually precipitated as microcrystals in accordance with the permeation of the solution. At this stage, the pore size distribution of the wet gel ranges from about ten to several hundreds of angstroms, in which the moving rate of the solution is small in the pores of the gel. Hence, the exchange between the solution in the pores and the solution outside the gel slowly proceeds. During that period, the lead acetate dissolved in the solution in the pores of the gel is conditioned to be capable of easily migrating toward the periphery of the gel.

Moreover, when the fixing operation of the lead acetate provided with a concentration distribution is poor, it further migrates toward the periphery, due to a slight dissolution in the solution for fixing present in the pores of the wet porous gel, in accordance with the evaporation of a solvent during the step of drying the gel, thereby being deposited at the periphery.

On the other hand, since this fixing operation causes microcrystals to gradually precipitate in the porous gel, the solvent exchange step must be performed in multiple stages, so that a large volume of solvent is required as an immersion liquid, and that a prolonged period of time is consumed to run through the whole step. The prolonged immersion of the porous gel disadvantageously causes the concentration distribution provided for the metal salt to readily break in the fixing step after distribution provision. In order to avoid this disadvantage, a measure, such as changing mixing proportions of solvents to bring about a lowered solubility, has been tried. However, the leaching of the metal salt outside the porous gel cannot be avoided, and crystal precipitation is observed in the fixing liquid due to the lowered solubility. Thus, no improvement is attained with respect to the break of the concentration distribution.

The above causes the concentration distribution of lead acetate in the gel produced by the method of Japanese Patent Application Laid-Open Specification No. 295818/1991 to have an inflection point and an extremum in the periphery and a low concentration in the center, so that the concentration difference is small between the periphery and the center.

The resultant xerogel is sintered to obtain a glass. The refractive index distribution of the thus obtained glass accords with the concentration distribution profile of lead, which exhibits a refractive index lower than a desired value in the center to thereby cause the refractive index difference (often referred to as "$\Delta n$") to be small between the center and the periphery and also exhibits an extremum and an inflection point in the radial direction (see FIG. 2). From the viewpoint of optical design, the glass only finds very limited use and application.

When a gradient index optical element is used in a lens system for a camera, etc., the distribution profile of refractive index thereof is important.

With respect to the gradient index optical element, the following relationship is observed between the refractive index and the distance from the center.

$$N(r) = N_0 + N_1 r^2 + N_2 r^4 + N_3 r^6 + \quad (1)$$

$N(r)$: refractive index at a radius r from the center of the element
$N_0$: refractive index in the center
$N_1, N_2, N_3 \ldots$: distribution coefficient.

What is important with respect to the distribution profile is $\Delta n$ and the distribution coefficient in the lens periphery, which concerns correction of chromatic aberration. (The power of the gradient index optical element depends on the value of $N_1$ when the influences of the coefficients $N_2$ and $N_3$ are small. The greater the value of $N_1$, i.e., the greater the value of $\Delta n$, the greater the effect of the gradient index optical element. For the chromatic aberration correction in the lens periphery, the distribution coefficients $N_3$ et seq. are important, which have marked influence on the distribution profile in the periphery.)

Fitting into formula (1) of the refractive index values at various points in the radial direction of the glass manufactured by the method disclosed in Japanese Patent Application Laid-Open Specification No. 295818/1991 reveals that the value of $N_3$ is large, with a distribution profile having a reversion of convex and concave refractive index profiles in the periphery, and that the refractive index in the center is low so that $\Delta n$ is as small as 0.070 (refer to FIG. 2).

When a lens system is prepared using the element with the above distribution profile, not only the value of $\Delta n$ is so small that the power of the medium per se is weak, but also an inflection point exists in the periphery of the lens, so that light cannot be satisfactorily condensed to thereby cause the effect of chromatic aberration correction characteristic of the gradient index optical element to be unattainable. The trial to obviate the inflection point in the periphery disadvantageously causes the lens to have an only limited effective diameter.

The proportion of the amount of the metal salt fixed in the pores of the porous gel to that of the metal salt leached out from the gel depends on the type and quantity of the metal salt, and so cannot be equally stated. However, at any rate, there is a limit in the method of Japanese Patent Application Laid-Open Specification No. 295818/1991 comprising changing the mixing ratio of solvents to precipitate microcrystals of a metal salt with the use of solubility difference only. Experimental study has revealed that desired effect cannot be attained, depending on the type of introduced metal and the required fixing precision (e.g., secure retention of a distribution profile in the manufacturing of a gradient index optical element).

Similar problems are encountered by the manufacturing of a glass provided with a refractive index distribution according to the generally known molecular stuffing method. In this method, for incorporating a large amount of metal component, a nitrate having a high solubility is used, and a fixing is performed with a solvent in which the solubility of the metal component is low, at a temperature difference of about 100° C. However, the nitrate generally has high solubility in a polar solvent, such as water and an alcohol. For example, the nitrate has a solubility of about 1 g/100 ml even in ethanol cooled to about 0° C. Thus, it is difficult to completely fix the metal in the porous body, and the metal salt dissolved in the fixing solution migrates during the drying step, so that a concentration distribution cannot be provided with desired precision. Moreover, it is difficult to cause the $\Delta n$ to have a large value.

The second major drawback relating to individual control of a plurality of metal components will now be described in detail.

The glass manufactured by the method of Japanese Patent Application Laid-Open Specification No. 295818/1991, besides the above-mentioned problem of the break of the metal distribution profile, suffers from cracks on the surface thereof, which render the glass unsatisfactory as an optical element.

The cracks are attributed to a distribution of $\alpha$ caused by a composition distribution along the radial direction. It is believed that the trial to compensate for the convex profile distribution of $\alpha$ due to the distribution of lead by the concave profile distribution of potassium is unsuccessful.

In this respect, the composition distribution of the prepared glass has been analyzed to obtain FIG. 3. The $\alpha$ distribution along the radial direction has roughly been estimated on the basis of the results as shown in FIG. 3 to obtain FIG. 4. A concave distribution profile is shown therein, which exhibits a small value of $\alpha$ in the center with a large value in the periphery because of overcorrection of $\alpha$ by potassium. It is believed that the concave profile distribution of $\alpha$ causes the radial shrinkage of the gel during the sintering step to suffer from a strain, which causes the glass to suffer from cracks.

Noting potassium concentrations as shown in FIG. 3, rendering the concentration difference between the center and the periphery insignificant would allow the $\alpha$ values as shown in FIG. 4 to be constant along the radial direction. For rendering the $\alpha$ values constant along the radial direction without changing the distribution profile of refractive index, it is believed that the concentration of a potassium salt in a distribution-providing liquid should be decreased while the time for distribution provision should remain unchanged. However, this is not effective for avoiding cracks. The composition distribution profile of the resultant glass has been studied to obtain FIG. 5. As indicated by solid lines therein, although the desired distribution profile has been realized with respect to potassium, the phenomenon has been found that it is accompanied by a change in the distribution profile of lead.

Shortening the distribution-providing time would be contemplated to avoid cracks. Actually, however, simply changing the time is not effective for avoiding cracks, and the disadvantage arises that the concave and convex metal composition distribution profiles are simultaneously changed to cause the desired refractive index distribution to be unattainable. In any way, it has been unfeasible to obtain an optical element with the desired distribution profile of refractive index.

Moreover, in the above conventional methods, it is unfeasible to individually control the concave and convex distribution profiles of metal components, as mentioned above. Hence, despite the possibility of the manufacturing of an optical element highly effective from the viewpoint of optical design if the composition distributions are provided with desirable concave and convex profiles, actually, it has been unfeasible to manufacture such an optical element.

SUMMARY OF THE INVENTION

With a view toward obviating the above two major drawbacks of the prior art, the present inventors have made extensive and intensive studies on the behaviors of metal salts in a porous body. As a result, it has been found that the drawbacks can be obviated by performing fixing and distribution provision in the presence of an acid or a salt. Based on this finding, the present invention has been completed.

It is, therefore, an object of the present invention to provide a method for manufacturing a glass, in which any desired metal species is introduced in the form of a salt into a porous body, in which the metal salt dissolved in the pores of the porous body can be securely fixed to the pores in the step for providing the introduced metal species with a concentration distribution, and in which the behaviors of a plurality of metal salts can be individually controlled in the porous body.

The foregoing and other objects, features and advantages of the present invention will become apparent from the following detailed description and appended claims taken in connection with the accompanying drawings.

BRIEF DESCRIPTION OF THE DRAWINGS

In the drawings:

FIG. 13 is a flowchart showing the steps of producing a glass element from a porous body.

DETAILED DESCRIPTION OF THE INVENTION

Figure 1:
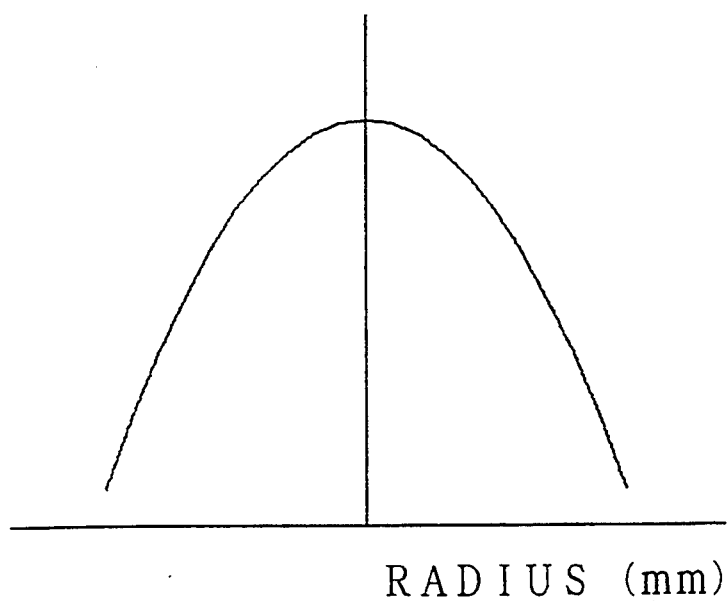
FIG. 1 shows an expected distribution of lead acetate concentration along a radial direction, exhibited during a distribution-providing step.
Figure 2:
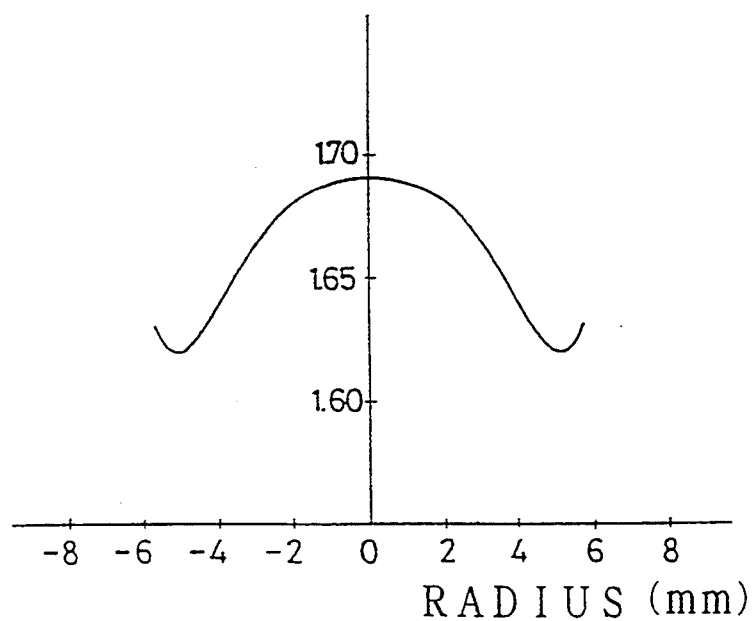
FIG. 2 shows the refractive index distribution, along a radial direction, of a glass manufactured by the prior art method (disclosed in Japanese Patent Application Laid-Open Specification No. 295818/1991)
Figure 3:
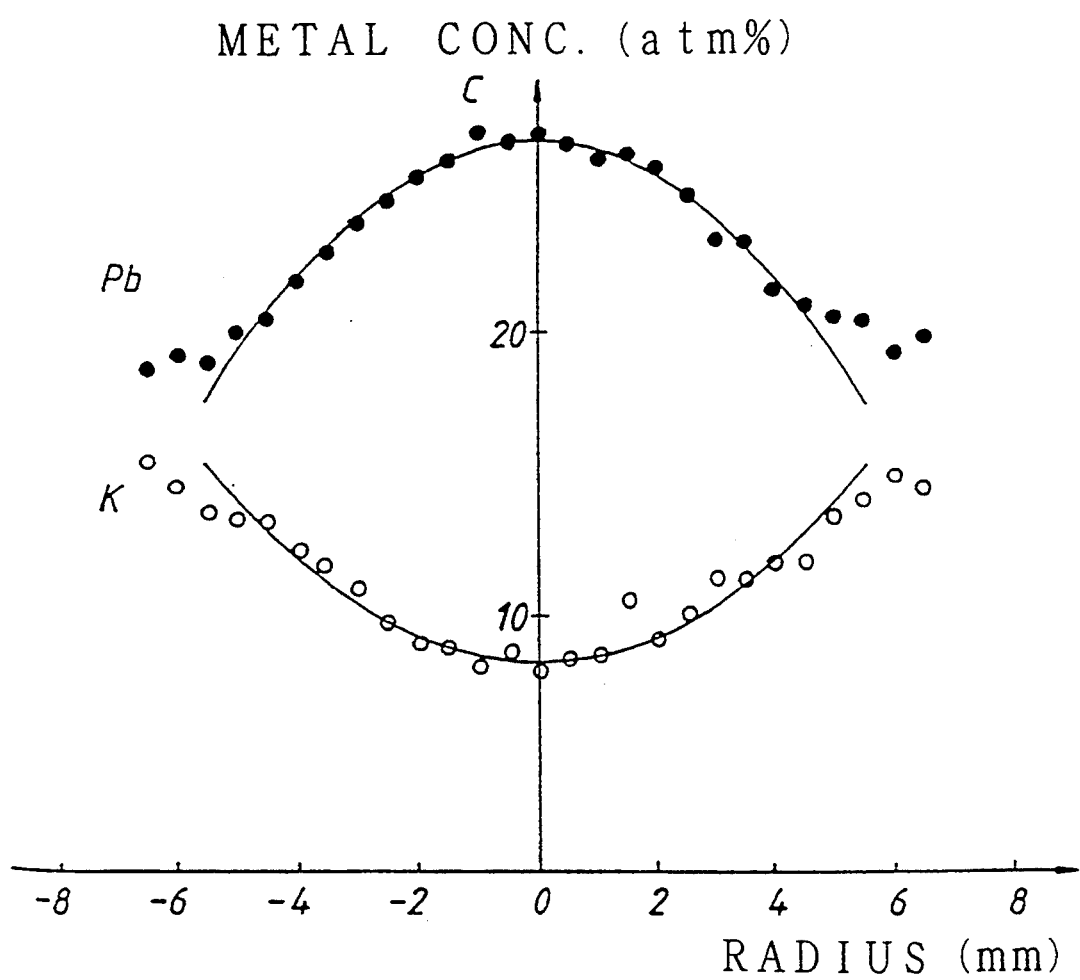
FIG. 3 shows the composition distribution, along a radial direction, of a gradient index optical element manufactured by the prior art method.
Figure 4:
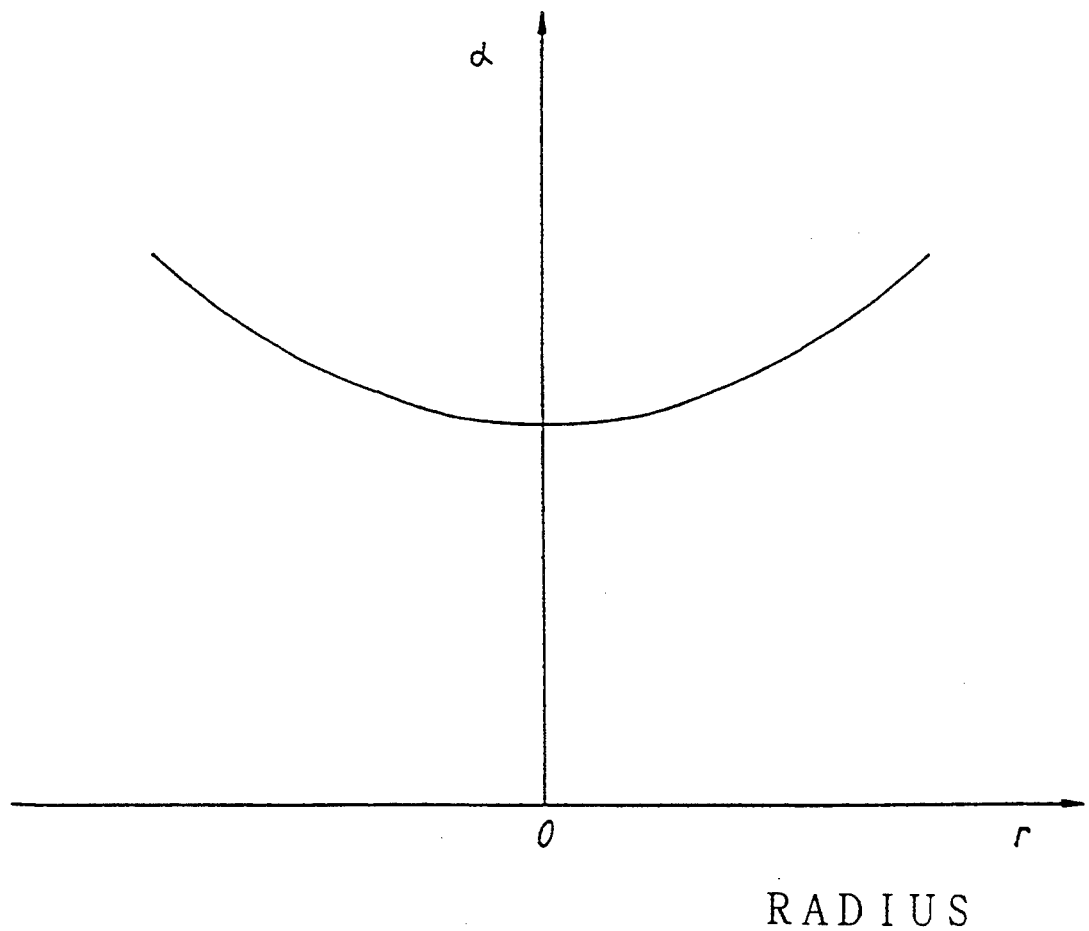
FIG. 4 shows the thermal expansion coefficient distribution, along a radial direction, of a gradient index optical element manufactured by the prior art method.
Figure 5:
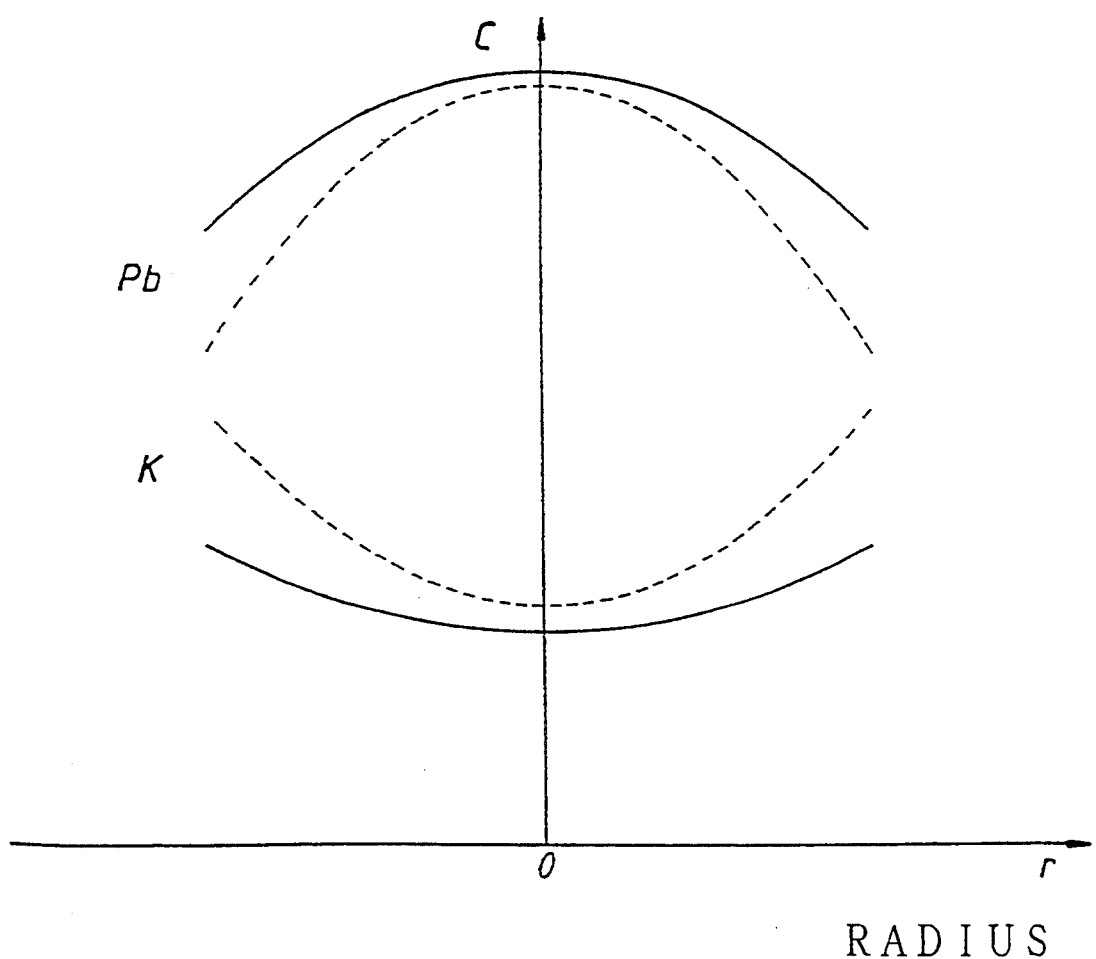
FIG. 5 shows a composition distribution along a radial direction, as exhibited when the concentration of potassium is changed in the prior art.

For attaining the above object, in one aspect of the present invention, there is provided a method for manufacturing a glass, comprising converting a porous body to a multi-component glass, wherein a porous body containing at least one metal component in the form of a metal salt is immersed in a solution containing at least one compound selected from the group consisting of an acid, an ammonium salt and an alkylammonium salt to precipitate the metal salt as microcrystals in the pores of the porous body.

In the above method, it is preferred that the metal salt contained in the porous body have the same anion as that of the compound contained in the immersion solution.

In another aspect of the present invention, there is provided a method for manufacturing a glass, comprising converting a porous body to a multi-component glass, wherein a porous body containing at least one metal component in the form of a metal salt is immersed in a solution containing a salt of a metal component different from the above-mentioned at least one metal component and at least one compound selected from the group consisting of an acid and a salt to provide the metal components with concentration distributions.

In this method, it is preferred that the compound contained in the immersion solution generate a cation having no influence on refractive index.

Further, it is preferred that the cation generated by the compound contained in the immersion solution be selected from the group consisting of a proton, an ammonium ion, an alkylammonium ion and an aluminum ion.

Still further, in the method comprising the distribution-providing step as well, it is preferred that the metal salt contained in the porous body have the same anion as that of the compound contained in the immersion solution.

Still further, it is preferred that all of the metal salt contained in the porous body, the compound contained in the immersion solution and the metal salt contained in the immersion solution have the same anion.

Still further, it is preferred that the compound contained in the immersion solution have an anion selected from the group consisting of a formate ion, an acetate ion, a propionate ion, a citrate ion, a malate ion, a maleate ion, an oxalate ion, a lactate ion, a chloride ion, a nitrate ion, a sulfate ion, a carbonate ion, a phosphate ion and a borate ion.

Still further, it is preferred that the above-mentioned compound be contained in the solution at a concentration varied with time.

The above-mentioned two major drawbacks of the prior art are overcome by the present invention. First, the function of the present invention will be described in connection with the first drawback regarding the fixing of metal components.

A metal salt is introduced into a porous body produced by the sol-gel method, the phase separation method, the CVD method, etc. to thereby cause the metal salt to be present in a form dissolved in a solvent in the pores of the porous body. The resultant porous body is immersed in another solvent for fixing. When this solvent contains at least one compound selected from an acid and a salt, more microcrystals can be precipitated than in the solvent per se not containing such a compound, as illustrated below.

In the fixing solvent, an acid $H_aX$ is dissociated according to the formula:

$$H_aX \rightleftharpoons aH^+ + X^{a-} \qquad (2).$$

The following equilibrium applies between the anion formed in the formula (2) and the metal anion:

$$Me_bX_c \rightleftharpoons bMe^{c+} + cX^{b-} \qquad (3).$$

The solubility product $K_{sp}$ is represented by the formula:

$$K_{sp} = [Me^{c+}]^b[X^{b-}]^c \qquad (4).$$

In the above formulae, Me represents a metal element, and $X^-$ an anion. $X^{a-}$ is supplied from an acid (or a salt) according to the formula (2). The solubility product of the formula (4) is constant as long as the temperature is constant. Accordingly, to satisfy the formula (4), the equilibrium of the formula (3) moves to the left. Thus, precipitation of the metal salt occurs.

Combinations of the metal ion and the acid or salt contained in the solvent, for use in the present invention, cause the solubility product of the formula (4) to have a desirably small value. Thus, as compared with the prior art, an increased amount of metal component can be satisfactorily fixed. Representative examples of compounds to be contained in the solvent include acetic acid, citric acid, malic acid, maleic acid, oxalic acid, lactic acid, hydrochloric acid, nitric acid, sulfuric acid, etc. These may be used in combination. The porous body may be immersed in the resultant solution a plurality of times.

In order to cause the metal component to have a uniform composition, a compound selected from an acid, an ammonium salt and an alkylammonium salt may be added as a component not affecting the metal composition. In a distribution-providing step, other various salts, e.g., metal salts, may be added in addition to the above-mentioned acid, ammonium salt and alkylammonium salt.

These acid and salt are selected taking into consideration the decomposition temperature, acid dissociation constant and addition amount thereof. Accordingly, the crystal precipitation rate can be controlled by selecting the type and amount of added acid or salt.

With respect to rare earth elements whose incorporation into a porous body has been difficult, a gel is prepared by a method in which a chloride or a nitrate is used as a raw material, or a method in which a salt having low solubility in water or an alcohol, such as an acetate, an acetylacetone salt and a metal alkoxide, is dissolved in hydrochloric acid to ensure high solubility. Then, the gel is immersed in a solution containing an acid or a salt, as shown in FIG. 13, to react the anion with the metal ion, so that a metal salt can be precipitated as microcrystals. Therefore, a large amount of microcrystals can be precipitated in the gel. Thus, it is feasible to uniformly dope a glass with a metal, in a large amount, whose incorporation into a glass in a large amount has been unattainable due to crystal precipitation and low solubility.

In manufacturing a glass with a refractive index distribution, also, the fixing operation can be performed under the action of an acid or a salt in accordance with the principle as described above. Thus, the above-mentioned break of the distribution can markedly be alleviated by promptly carrying out the fixing treatment subsequent to the distribution-providing operation. Consequently, in the next drying step, the fixing of the metal salt in the porous body can be so fully maintained that migration of the metal salt occurs to break the distribution profile. Thus, a porous body with a desirably accurate profile of metal concentration distribution, can be obtained. Sintering of the resultant porous body causes microcrystals of the metal salt precipitated in the pores to be readily decomposed, so that the decomposition product is taken in the porous body and the pores are eliminated. As a result, the desired glass is obtained.

With respect to the acid and salt added to a distribution-providing liquid, also, they remain in the gel through the distribution fixing and drying steps to function so as to keep the solubility product constant. Thus, the solubility of the metal salt is decreased, so that the distribution profile, which is broken by the dissolution of the metal salt in a solvent in the prior art, can be maintained until the stage of the formation of a xerogel. Therefore, a xerogel can be obtained, which has a distribution of metal salt concentration exhibiting a monotonous decline from the center to the periphery with neither inflection point nor extremum. Sintering of the xerogel in a manner as mentioned above provides a glass with a highly optically effective distribution profile of refractive index, having a high value of $\Delta n$.

Now, the effect of the present invention will be described in connection with the second drawback of the prior art regarding individual control of a plurality of metal components.

With respect to distribution provision, it has conventionally been believed that, when use is made of a distribution-providing liquid in which a salt of a first metal component contributing to provision of a refractive index distribution, present in the gel, has a significant solubility, the liquid penetrates in the gel to dissolve crystals of the first metal component salt precipitated on the pore wall to leach them out in the form of a metal salt from the gel, thereby defining a distribution profile. On the other hand, another metal salt has been incorporated in the distribution-providing liquid, as a second metal component. In this connection, it has been believed that the metal salt penetrates concurrently with the diffusion of the distribution-providing liquid into the gel, in which the metal salt is precipitated as microcrystals, together with the salt of the first metal component, on the pore wall in the subsequent fixing treatment, thereby defining a distribution profile.

These conventional beliefs assuming the dissolution of a whole molecule do not lead to the impossibility of individual control of distribution profiles as described in connection with the prior art. Therefore, the following novel observation has been made.

It has been assumed that, when use is made of a solvent as a distribution-providing liquid in which the first metal component salt precipitated on the pore wall has a considerably high solubility, the amount of the first metal component dissolved into the distribution-providing liquid in the form of a salt molecule is small, and that, accordingly, the actual provision of distribution is mostly attained by the ion exchange, through the solvent, between ions of the first metal component and ions of the second metal component in the distribution-providing liquid. Under this assumption, such a counter diffusion occurs that the first metal component in the gel diffuses toward outside the gel in the form of metal ions, while the second metal component in the distribution-providing liquid diffuses toward an interior of the gel in the form of metal ions. If a charge balance during the ion exchange is taken into account, simply decreasing the concentration of the second metal component salt in the distribution-providing liquid would not lead to control of only the distribution profile of the second metal component, but to simultaneous changes of the concentrations of the first and second metal components, thereby causing the desired composition distributions, i.e., individual control of the composition distributions, to be unattainable.

Therefore, for flattening the distribution of $\alpha$ along a radial direction with respect to the composition system of Japanese Patent Application Laid-Open Specification No. 295818/1991, the inventors have contemplated not only decreasing the amount of the second metal component salt in the distribution-providing liquid but also adding compounds other than the first and second metal component salts to the distribution-providing liquid, said compounds being dissociated in the distribution-providing liquid to form a cation or proton (hereinafter referred to as "$Z^+$") which does not affect the glass properties after sintering. That is, they have contemplated the addition of an acid or a salt to the distribution-providing liquid in addition to the salt of the second metal component. The acid or salt is dissociated in the distribution-providing liquid to form a cation or proton. That is, metal ions from the second metal component and $Z^+$ from the dissociable compound are present in the distribution-providing liquid. Simultaneously with the ion exchange between the first metal compound in the gel and the second metal compound in the distribution-providing liquid, the metal ions from the first metal component in the gel are exchanged with the $Z^+$ in the distribution-providing liquid. Control of the amount of $Z^+$ permits individual control of the distribution profiles of the first and second metal components, so that a desired distribution profile can be ensured for each of the metal components.

Illustratively stated, a shortage of the second metal component is compensated for by the addition of Z as a third component.

Since the convex distribution profile of the first metal component and the concave distribution profile of the second metal component can be individually controlled, it is feasible to cause the $\alpha$ distribution based on the $\alpha$ contribution of the first metal component and the $\alpha$ contribution of the second metal component to desirably exhibit constant value along a radial direction, while causing the refractive index distribution based on the refractive index contribution of the first metal component and the refractive index contribution of the second metal component to have a desirable convex profile. This is not limited to the relationship between the refractive index distribution and $\alpha$, and suggests that any pair of different properties of a glass generally depending on composition changes can individually, separately be controlled. Herein, the refractive index contribution refers to what is generally known as atomic refraction or the like, and the $\alpha$ contribution refers to what is generally known as linear thermal expansion coefficient or the like for the sum of relevant components.

It is preferred that Z be selected from those having less effect on the properties of a glass, for ensuring desirable properties for the glass. From this viewpoint, Z is preferably selected from acids, such as acetic acid, nitric acid, sulfuric acid, carbonic acid, phosphoric acid, boric acid, lactic acid and citric acid, and water which supply proton as $Z^+$. The supplied proton is incorporated in the porous body. The incorporated proton, for example, is coupled with an acetate ion ($CH_3COO^-$), if present, to give acetic acid, which undergoes in the subsequent sintering step the following decomposition reaction:

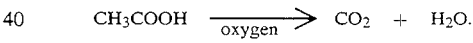

$$CH_3COOH \xrightarrow{oxygen} CO_2 + H_2O.$$

If unreacted hydroxyl (OH) is present in the skeleton of the porous body, the incorporated proton reacts with the hydroxyl to form water ($H_2O$), which is evaporated off. Accordingly, the incorporation of proton may exert no significant effect on the glass properties, and therefore, is particularly preferred. However, Z is not limited to the above acids and water, and any compounds are suitable as long as cations, other than proton, having no adverse effect on the above pair of noted glass properties are supplied. If the noted glass properties are a combination of $\alpha$ and refractive index, suitable cations other than protons include those comprised of elements which are decomposed into removable $NO_x$, $SO_x$, $CO_x$, etc. at the time of gel sintering, such as ammonium ion (inclusive of alkylammonium ion), and aluminum ion.

With respect to other requirements for Z, it is preferred that Z have the same anion as that of the metal species provided with a distribution, because no problem would arise due to anion size, anion migration, etc., such that it would be feasible to control only the migration of the desired metal species.

For example, when the metal species is in the form of an acetate, Z is preferably selected from acetic acid, ammonium acetate, aluminum acetate, etc. When the metal species is in the form of a nitrate, Z is preferably selected from nitric acid, ammonium nitrate, aluminum nitrate, etc.

The above pair of controllable glass properties are not limited to the combination of refractive index and α, and include a combination of refractive index and glass transition temperature, a combination of refractive index and Abbe number, etc. Further, the distribution profile in the glass is not limited to the above combination of convex profile and constant value, and includes a combination of convex and concave profiles, a combination of concave profile and constant value, etc. With respect to concave and convex variation degrees as well, desirable control can be achieved.

In particular, in the distribution-providing step and in the metal salt-fixing step after distribution provision, the acid or salt added to the solvent preferably has the same anion as that of at least one member selected from the metal salt contained in the gel and the metal salt contained in the distribution-providing liquid. Only the metal salt having the same anion is likely to be selectively fixed. It is still preferred that the salt of the first metal component and the salt of the second metal component have the same anion, because otherwise, different temperature ranges are required for the combustion and decomposition of anions in the sintering step, so that at each occasion, an additional step for providing a temperature hold in sintering schedule, etc. becomes requisite.

The acid or salt added to the solvent, the first metal component salt contained in the gel and the second metal component salt dissolved in the distribution-providing liquid, preferably each have an anion which is burned and decomposed in the sintering step not to remain in the final glass. The metal salts are preferably selected from organic acid salts, such as a formate, an acetate, an oxalate, a citrate, a malate and a maleate, and inorganic acid salts, such as a nitrate, a sulfate and a chloride. In conformity with these metal salts, the acid or salt added to the solvent is preferably selected from formic acid, acetic acid, oxalic acid, maleic acid, nitric acid, sulfuric acid, hydrochloric acid and salts thereof.

The embodiments of the present invention include examples in which lead acetate is contained in the gel and potassium acetate and acetic acid are added to a distribution-providing liquid, and in which an organic acid is added to a rare earth element salt. However, these do not limit the acid or salt for use in the present invention, and suitable ones may be selected from a large variety of compounds, depending on the use thereof.

The acid or salt is added to the solvent in an amount such that the metal salts contained in the gel and in the distribution-providing liquid are not precipitated.

The acid or salt can exert the desired effect not only when it is added in the beginning to a fixing liquid but also when it is added in the immersion stage. Depending on the type of selected metal salt, solvent, acid, etc., a lump addition of the acid or salt is likely to cause excessive crystal precipitation to thereby bring about growth of crystals in the skeleton of the porous body resulting in rupture of the same. In such a situation, if fixing is conducted while changing the concentration of the acid or salt in the solution with time, a high effect is attained. This can be accomplished by for example, by dropwise addition. The concentration of added acid or salt depends on the type thereof, and is determined taking the dissociation constant, etc. into account. As a result, the number of steps for solvent exchange can be decreased, and the period of time through the process and the amount of applied solvent can be markedly reduced.

In particular, in the manufacturing of a glass with a distribution of refractive index and other properties, the distribution profile is important, as mentioned above. The acid or salt added to the solvent is effective even at a concentration of from one over several hundred to a fraction of one in terms of normality to accomplish desired fixing of microcrystals of the metal salt in the porous body. Accordingly, for a gradient index optical element, etc. for which distribution profile precision is required, desirably accurate distribution control can be made by regulating the change with time in the concentration of added acid or salt.

Herein, the distribution control, especially control of convex profile distribution, along a radial direction is described. The present invention is not limited to this, and also applies to gradient index optical elements with a concave profile distribution along a radial direction (i.e., refractive index increases from the center toward the periphery), with a distribution along an axial direction, and with a distribution along a spherical direction.

The method for producing a porous body containing a metal element is not critical. For example, a porous gel may be produced by first dissolving a salt of rare earth element or the like in water or the like to prepare a sol and then gelling the sol according to the sol-gel process. Alternatively, a separately prepared porous gel may be immersed in a solution of a metal element. The resultant gels may be dried or sintered to obtain a porous body for use in the present invention. Moreover, the porous body may be produced according to the CVD process or by a phase separation of glass.

As apparent from the foregoing, a glass containing various elements, provided with a concentration distribution and thus with a refractive index distribution, can be readily manufactured by the method of the present invention.

PREFERRED EMBODIMENT OF THE INVENTION

The present invention will now be described in greater detail with reference to the following Example and Comparative Examples, which should not be construe as limiting the scope of the present invention.

EXAMPLE 1

15.5 ml of $Si(OC_2H_5)_4$ (tetraethyl silicate, hereinafter referred to as "TEOS") and 43.1 ml of 1-propanol were mixed together. Then, 1.25 ml of a 0.01N aqueous HCl solution was added to the mixture, and stirred for 60 min. to effect partial hydrolysis. Thereafter, 9.0 g of $Al(Osec-C_4H_9)_2(C_6H_8O_3)$ was further added and stirred for 60 min. Subsequently, 16.3 ml of a 3N aqueous HCl solution having 10.2 g of $La(CH_3COO)_3 \cdot 1.5H_2O$ dissolved therein was added, stirred, poured into a polypropylene beaker, and gelled to obtain a wet gel. This wet gel was aged at 60° C. for 7 days, and successively immersed in a 4N aqueous acetic acid solution and ethanol. The resultant gel was dried at 100° C., and sintered at temperatures elevated to 1400° C. Thus, a glass with a desired composition of $70SiO_2 \cdot 15Al_2O_3 \cdot 15La_2O_3$ (mol %) was obtained, which was free from striae, contained no impurities and was homogeneous.

COMPARATIVE EXAMPLE 1

A wet gel was produced in substantially the same manner as in Example 1. The wet gel was immersed in ethanol, dried at 100° C., and sintered at temperatures elevated to 1400° C. The resultant glass had a composition of $78SiO_2.15Al_2O_3.7La_2O_3$ (mol %). Thus, a glass with the desired composition was not obtained.

EXAMPLE 2

151.8 ml of IPA and 10.7 ml of a 0.01N aqueous HCl solution were added to 88.1 ml of $Si(OCH_3)_4$ (tetramethyl silicate, hereinafter referred to as "TMOS"), and stirred for 30 min to effect partial hydrolysis. Then, 42.64 g of $Ti(OiC_3H_7)_4$ was further added, and stirred for 30 min. The resultant mixture was mixed with a dispersion of 15.3 g of silica powder (Aerosil manufactured by Aerosil Co.) in 108.0 ml of IPA. Thereafter, 200 ml of an aqueous hydrochloric acid solution having 26.8 g of $Y(OCH_3)_3$ dissolved therein was dropwise added, and stirred to effect hydrolysis, thereby obtaining a sol. This sol was placed in a polypropylene container, sealed, and gelled to obtain a wet gel. This wet gel was immersed first in a 0.2 mol/liter aqueous citric acid solution for 12 hr and then in a mixture of IPA and acetone for 24 hr. The resultant gel was dried at 60° C., and heated to 140° C. Thus, a glass with a composition of $74SiO_2.13TiO_2.13Y_2O_3$ (mol %) corresponding to charged composition was obtained, which was completely free from striae, homogeneous and transparent.

EXAMPLE 3

Figure 6:
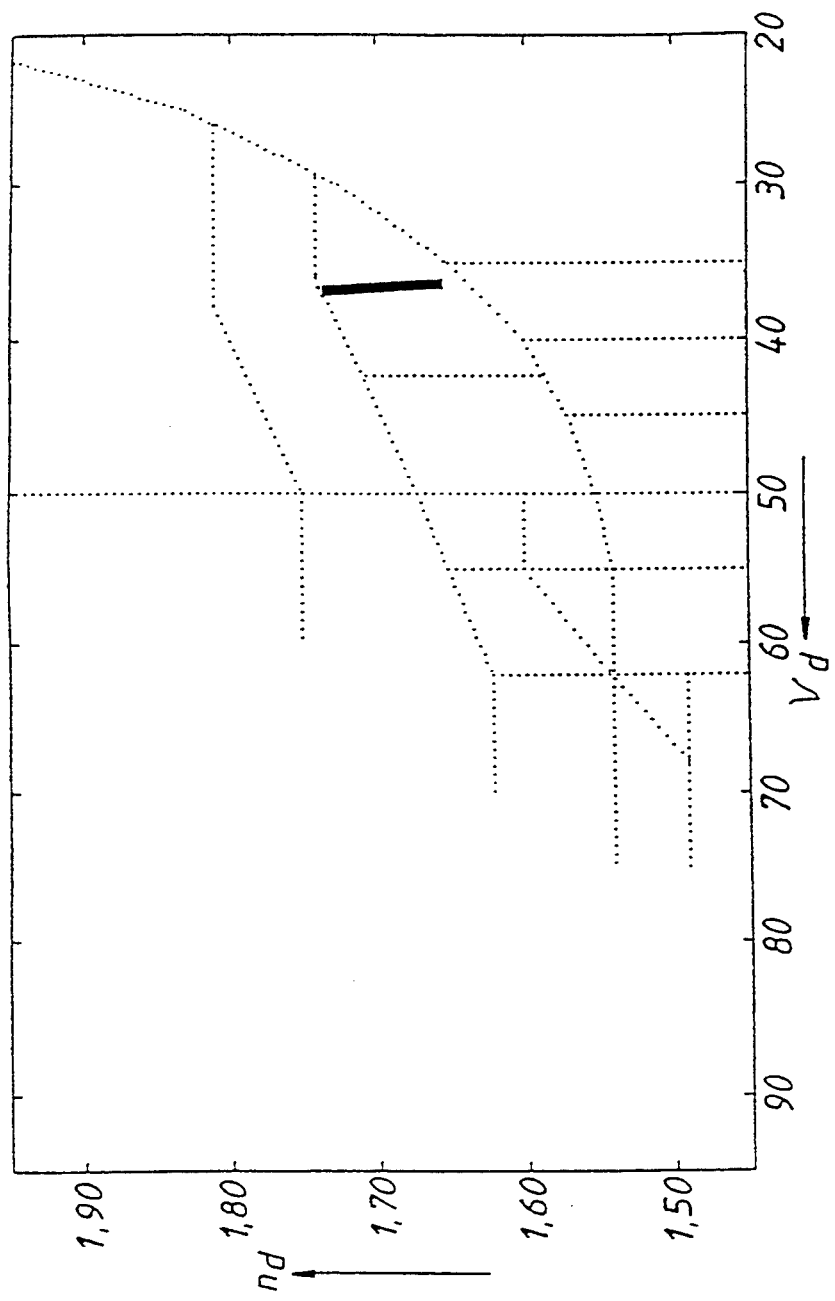
FIG. 6 shows the optical characteristics, along a radial direction, of the glass manufactured in Example 3.

4.81 ml of TMOS was mixed with 11.4 ml of ethanol. Then, 0.6 ml of a 1/100N aqueous HCl solution was added, and stirred for 60 min to effect partial hydrolysis. Thereafter, 4.5 g of $Al(Osec-C_4H_9)_2(C_6H_8O_3)$ was further added and stirred for 60 min. Subsequently, 2.5 g of $Ti(OiC_3H_7)_4$ was added, and stirred for 30 min. Further, 25.0 ml of a 1N aqueous HCl solution having 8.7 g of $La(NO_3)_3.6H_2O$ dissolved therein was added, stirred, put into a polypropylene beaker, and gelled to obtain a wet gel. This wet gel was aged at 60° C. for 3 days, and immersed in a 0.3 mol/liter EDTA solution to fix La. The resultant gel was immersed in a 6:4 (volume ratio, hereinafter ratio being by volume) methanol and water solution to provide La with a concentration distribution, and successively immersed in ethanol and acetone. After the immersion, the gel was dried at 100° C., and sintered up to 1380° C. Thus, a glass with a concentration distribution of La and consequently with a refractive index distribution, was obtained. The thus obtained glass was sliced to measure optical characteristics, which were as shown in FIG. 6. The optical characteristics were found to be effective from the viewpoint of optical design.

EXAMPLE 4

21.1 ml of TEOS was mixed with 43.1 ml of i-propanol. Then, 1.7 ml of a 1/100N aqueous HCl solution was added, and stirred for 60 min to effect partial hydrolysis. Thereafter, 1.5 g of $Al(Osec-C_4H_9)_2(C_6H_8O_3)$ was further added and stirred for 60 min. Subsequently, 16.3 ml of a 1N aqueous HCl solution having 2.41 g of $Nd(C_6H_7O_2)_3$ dissolved therein was added, stirred, put into a polypropylene beaker, and gelled to obtain a wet gel. This wet gel was aged at 60° C. for 7 days, and immersed in lactic acid and then in methanol. After the immersion, the gel was dried at 40° C., and sintered up to 1400° C. Thus, a transparent glass with a composition of $95SiO_2.2.5Al_2O_3.2.5Nd_2O_5$ (mol %) corresponding to charged composition, was obtained. The fluorescent characteristics of the thus obtained glass were measured. A laser transition was observed with respect to an excited light of about 720–830 μm. Further, oscillation was confirmed when the glass was subjected to 1.06 μm laser oscillation.

EXAMPLE 5

350 ml of ethanol and 300 ml of a 1/100N aqueous HCl solution having 45.5 g of $Al(OsecC_4H_9)_3$ and 30.4 g of $Tm(HCOO)_3$ dissolved therein were added to 125.7 ml of TMOS containing 51.1 g of $Ti(OnC_4H_9)_4$ to effect hydrolysis. Thereafter, the mixture was put into a glass container having an inner diameter of 20 mm, and gelled to obtain a wet gel. This wet gel was aged at 40° C., immersed in a citric acid solution, dried at 100° C., and sintered up to 400° C. in an oxygen atmosphere to thereby obtain a porous glass. The porous glass was immersed in an ethanol solution of $Tm(NO_3)_3$ to effect immersion into the pores of the porous glass, and then in a maleic acid solution. After the immersion, the gel was dried at 50° C., and sintered up to 1420° C. Thus, a glass with a composition of $56.5SiO_2.15TiO_2.18.5Al_2O_3.10Tm_2O_3$ (mol %) was obtained. The fluorescent characteristics of the thus obtained glass were measured to observe a laser transition. Further, oscillation was confirmed when the glass was subjected to laser oscillation.

EXAMPLE 6

30 ml of TMOS, 30 ml of TEOS and 12.4 ml of $B(OCH_3)_3$ were mixed together, and 25 ml of a 1/100N aqueous hydrochloric acid solution was added. The mixture was stirred for 1 hr to effect partial hydrolysis. Then, a mixture of 107.63 ml of a 1.25 mol/liter aqueous lead acetate solution and 15.35 ml of acetic acid was added, and vigorously stirred to obtain a sol. The sol was transferred to a container, and gelled.

This gel was immersed in a solution of lead acetate in IPA/water to strengthen the same, and then in an IPA/acetone solution to precipitate and fix microcrystals of lead acetate. The gel containing the microcrystals of lead acetate was immersed in an ethanol solution of potassium acetate for 6 hr to bring about a distribution such that the lead acetate concentration is high in the center and low in the periphery in the gel. The resultant gel was immersed in a solution comprised of 0.01N acetic acid/IPA and acetone at a ratio of 5:5 by volume, and then in acetone to fix the distribution. After the immersion, the gel was dried, and sintered up to 620° C. to obtain a colorless, transparent glass.

Figure 7:
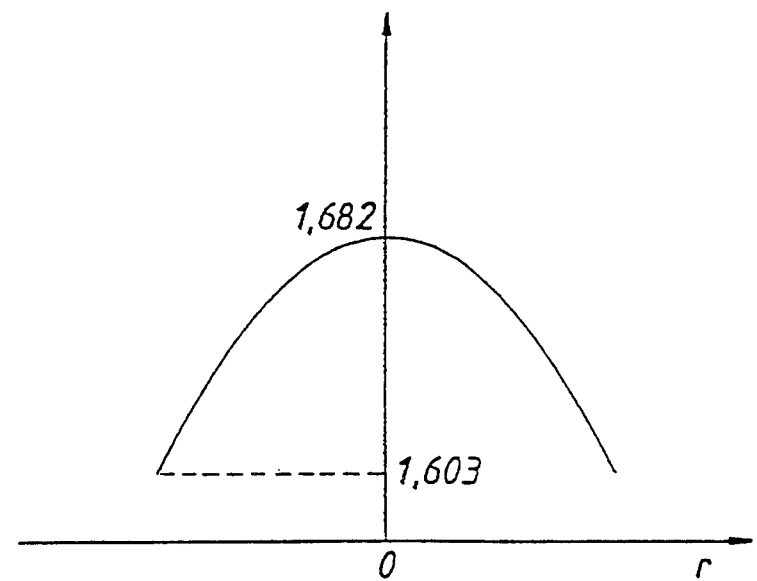
FIG. 7 shows the refractive index distribution, along a radial direction, of the glass manufactured in Example 6.

The refractive index distribution profile of the thus obtained glass was as shown in FIG. 7, having no inflection point to thereby attest to a wide range of applications.

COMPARATIVE EXAMPLE 2

The procedure of Example 6 was repeated up to distribution provision to obtain a gel. In the subsequent fixing operation, the gel was immersed in a solution comprised of IPA not containing acetic acid and acetone at a ratio of 5:5 by volume, and then in acetone. After the immersion, the gel was dried and sintered to obtain a glass. The thus obtained glass had a broken distribution profile of lead acetate, and accordingly a refractive index distribution profile broken in the periphery. The final glass element had a defect in properties in view of optical design.

EXAMPLE 7

15 ml of TMOS and 30 ml of TEOS were mixed together, and 20 ml of a 0.01N aqueous hydrochloric acid solution was added. The mixture was stirred for 1 hr to effect partial hydrolysis. Then, a mixture of 50.38 ml of a 1.25 mol/liter aqueous lead acetate solution, 10.85 ml of a 1.0 mol/liter aqueous barium acetate solution and 15.35 ml of acetic acid was added, and vigorously stirred to obtain a sol. The sol was transferred to a container, and gelled.

This gel was immersed in a solution of lead acetate and barium acetate in IPA/water to strengthen the same, and then in an IPA/acetone solution to precipitate and fix microcrystals of lead and barium acetates. The gel containing the microcrystals of lead and barium acetates was immersed in an ethanol solution of potassium acetate for 6 hr to bring about a distribution such that each of the lead acetate and barium acetate concentrations is high in the center and low in the periphery in the gel, and that the potassium acetate concentration is low in the center and high in the periphery.

The resultant gel was immersed in a solution comprised of 0.02N lactic acid/IPA and acetone at a ratio of 6:4 by volume, and then in acetone to fix the distribution. After the immersion, the gel was dried, and sintered up to 620° C. to obtain a colorless, transparent glass.

The refractive index distribution profile of the thus obtained glass had no inflection point to thereby attest to a wide range of applications.

COMPARATIVE EXAMPLE 3

The procedure of Example 7 was repeated up to distribution provision to obtain a gel. In the subsequent fixing operation, the gel was immersed in a solution comprised of IPA not containing lactic acid and acetone at a ratio of 6:4 by volume, said ratio being the same as in Example 7, followed by the same procedure as in Example 7. The thus obtained glass had a broken distribution profile of barium acetate, so that desired optical characteristics were not obtained.

Therefore, the ratio of IPA to acetone of the above fixing solution was so changed that the proportion of acetone was increased to promote precipitation of microcrystals. In this case, however, when the gel was immersed in the fixing solution, crystal precipitation occurred in the solution to cause the outer surface of the gel to suffer from crystal adhesion. This caused cracks in the drying step subsequent to the fixing, so that a uniform glass was not obtained.

EXAMPLE 8

The gel produced in substantially the same manner as in Example 6 was immersed in a solution of lead acetate in IPA/water to strengthen the same, and then in an IPA/acetone solution to precipitate and fix microcrystals of lead acetate. The gel containing the microcrystals of lead acetate was immersed in an ethanol solution of potassium acetate for 2 hr to bring about a distribution such that the lead acetate concentration is high in the center and low in the periphery in the gel.

The resultant gel was immersed in a solution comprised of IPA and acetone, and from 1 hr later, a 1 mol/liter acetic acid-acetone solution was dropwise added at a rate of 1.2 ml/hr to fix the distribution. After the immersion, the gel was dried, and sintered up to 620° C. to obtain a colorless, transparent glass.

The refractive index distribution profile of the thus obtained glass had no inflection point to thereby attest to a wide range of applications.

EXAMPLE 9

Figure 8:
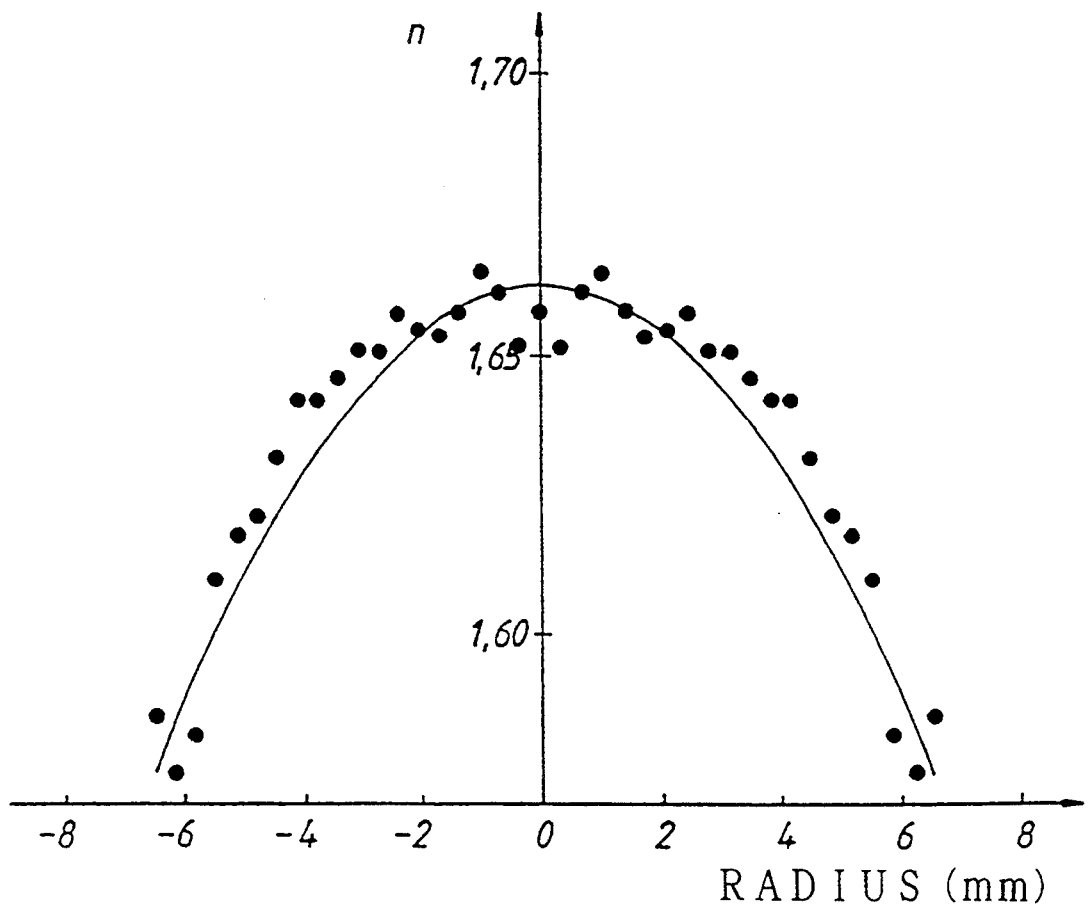
FIG. 8 shows the refractive index distribution, along a radial direction, of the glass manufactured in Example 9.

30 ml of TMOS, 30 ml of TEOS and 12.4 ml of triethyl borate were mixed together, and 25 ml of a 1/100N aqueous hydrochloric acid solution was added. The mixture was stirred for 1 hr to effect partial hydrolysis. Then, a mixture of 107.63 ml of a 1.25 mol/liter aqueous lead acetate solution and 15.35 ml of acetic acid was added, vigorously stirred at room temperature for 3 min, allowed to stand still for 2 min, and transferred to a polypropylene container having a diameter of 35 mm. Gelation was conducted at room temperature, and the gel was aged at 30° C. for 5 days and immersed at 60° C. in a 0.61M lead acetate solution in a solvent comprised of IPA and water at a ratio of 8:2 to remove acetic acid and age the gel. The resultant gel was successively immersed in IPA, a 8:2 IPA/acetone solution, a 5:5 IPA/acetone solution and acetone each for two days to precipitate and fix microcrystals of lead acetate in the pores of the gel. The resultant homogeneous gel was immersed in 150 ml of an ethanol solution having 0.305 mol/liter potassium acetate and 0.153 mol/liter acetic acid dissolved therein for 16 hr to bring about a distribution. The resultant gel was successively immersed in a 5:5 IPA/acetone solution, acetone and acetone each for two days to precipitate and fix microcrystals of lead and potassium acetates in the pores of the gel. After the immersion, the gel was dried at 30° C. for 5 days, and sintered at temperatures elevated up to 570° C. to obtain a colorless, transparent glass having no cracks. Investigation of the composition distribution of the glass showed that a gradient index optical element with a refractive index distribution of FIG. 8 was obtained, having a convex distribution profile of lead component and a concave distribution profile of potassium component along a radial direction.

COMPARATIVE EXAMPLE 4

Figure 9:
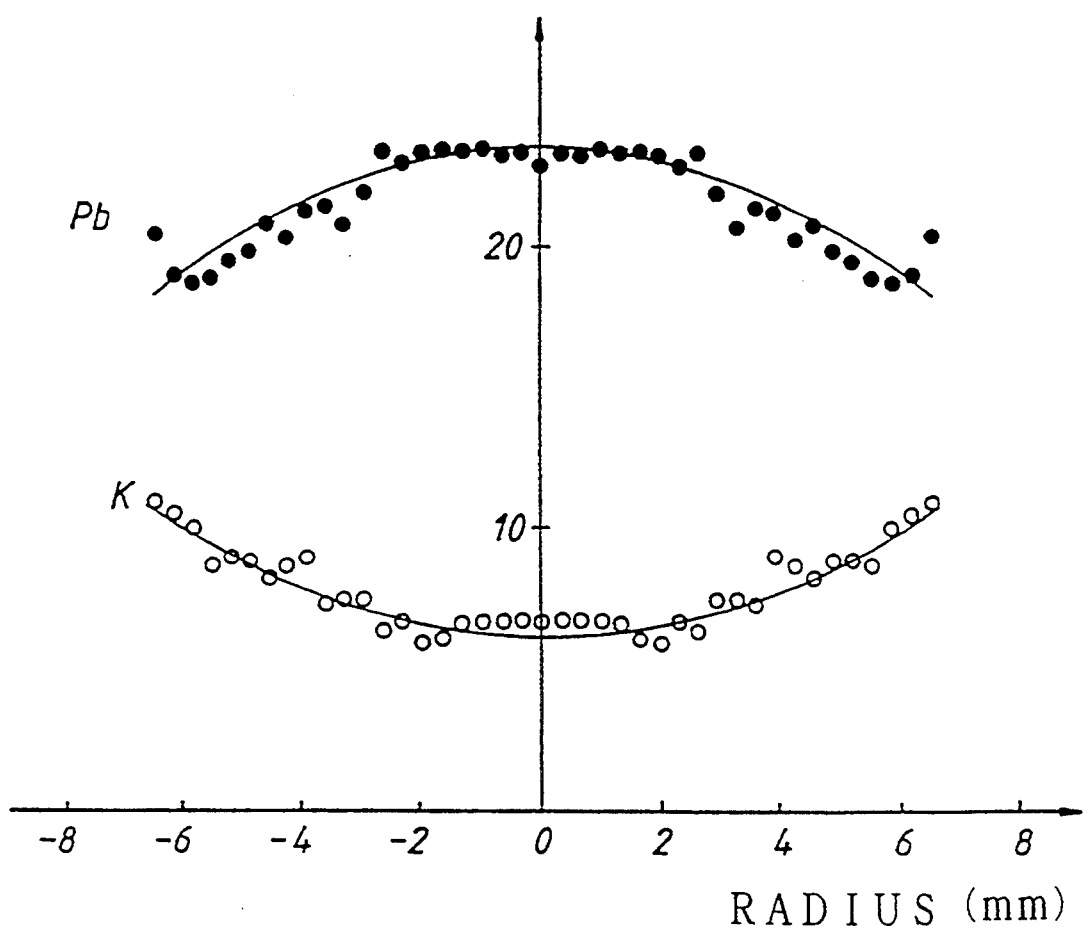
FIG. 9 shows the composition distribution, along a radial direction, of the glass manufactured in Comparative Example 4.

A gel was produced in substantially the same manner as in Example 9, and immersed in an ethanol solution having 0.305 mol/liter potassium acetate dissolved therein for 16 hr to provide a distribution. Sintering of the resultant gel at 565° C. produced a glass with cracks. Cracks were not avoided by changing the concentration of potassium acetate. The composition distribution of the glass along a radial direction was as shown in FIG. 9.

EXAMPLE 10

Figure 10:
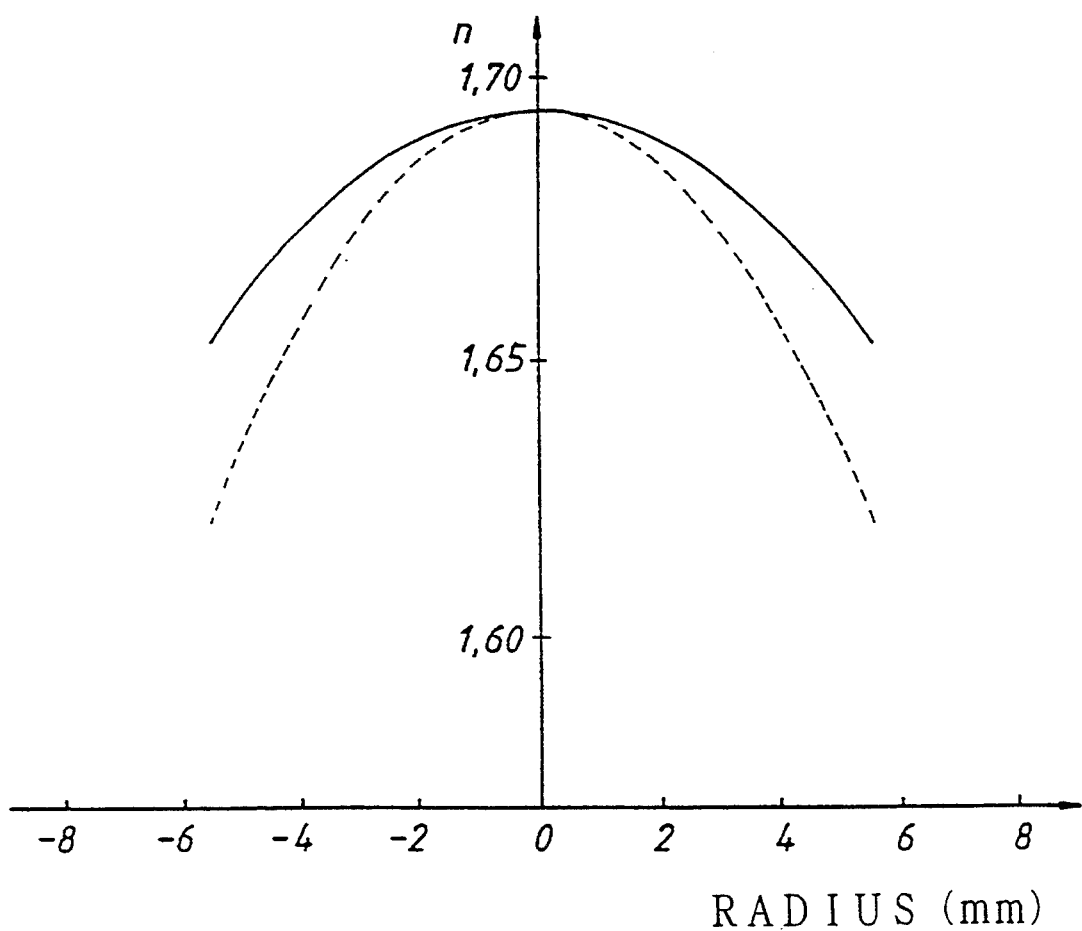
FIG. 10 shows the refractive index distribution, along a radial direction, of the glass manufactured in Example 10.

Sol production and the subsequent treatment were carried out in the same manner as in Example 9, except that the time for distribution provision was changed from 16 hr to 8 hr, and that the distribution-providing solution was changed to an ethanol solution having 0.305 mol/liter potassium acetate and 0.120 mol/liter acetic acid dissolved therein. Thus, also, a glass having no cracks was obtained. The refractive index distribution of the glass was as shown in FIG. 10. Therefore, it was found that a gradient index optical element having no cracks could be produced by changing the time for distribution provision from 16 hr to 8 hr to control the convex distribution profile of lead and the concave distribution profile of potassium. (The difference in the time for distribution provision causes a slight difference in the distribution of refractive index.)

EXAMPLE 11

15 ml of TMOS, 15 ml of TEOS and 6.2 ml of triethyl borate were mixed together, and 12.5 ml of a 1/100N aqueous hydrochloric acid solution was added. The mixture was stirred at room temperature for 1 hr to effect partial hydrolysis. Then, a mixture of 53.82 ml of a 1.25 mol/liter aqueous barium acetate solution and 15.35 ml of acetic acid was added, vigorously stirred for 3 min, allowed to stand still for 2 min, and transferred to a polypropylene container having a diameter of 12 mm. Gelation was conducted at room temperature, and the gel was aged at 30° C. for 7 days and immersed at 60° C. in a 0.65 mol/liter barium acetate solution to remove acetic acid and age the gel. The resultant gel was successively immersed in methanol, ethanol and acetone to fix barium acetate. The resultant homogeneous gel was immersed in 20 ml of an ethanol solution having 0.305 mol/liter potassium acetate and 0.305 mol/liter acetic acid dissolved therein for 2 hr to bring about a distribution. The resultant gel was successively immersed in methanol, ethanol and acetone to fix the distribution profile. After the immersion, the gel was dried at 30° C. to obtain a gel with a convex distribution profile of barium and a concave distribution profile of potassium along a radial direction. The gel was sintered at 650° C. to obtain a transparent glass having no cracks. Investigation of the optical characteristics of the glass showed that a gradient index optical element highly effective in view of optical design was obtained, having a composition distribution exhibiting a high refractive index and a low dispersion in the center and a low refractive index and a high dispersion in the periphery.

EXAMPLE 12

15 ml of TMOS, 15 ml of TEOS and 6.2 ml of triethyl borate were mixed together, and 12.5 ml of a 1/100N aqueous hydrochloric acid solution was added. The mixture was stirred at room temperature for 1 hr to effect partial hydrolysis. Then, 53.82 ml of a 1.25 mol/liter aqueous lead nitrate solution was added, vigorously stirred for 3 min, allowed to stand still for 2 min, and transferred to a polypropylene container having a diameter of 12 mm. Gelation was conducted at room temperature, and the gel was aged at 30° C. for 7 days and immersed at 60° C. in a 0.65 mol/liter lead nitrate solution to age the gel. The resultant gel was successively immersed in methanol, ethanol and acetone to fix lead nitrate. The resultant homogeneous gel was immersed in 20 ml of an ethanol solution having 0.305 mol/liter potassium nitrate and 0.153 mol/liter nitric acid dissolved therein for 2 hr to bring about a distribution. The resultant gel was successively immersed in methanol, ethanol and acetone to fix the distribution profile. After the immersion, the gel was dried at 30° C. to obtain a gel with a convex distribution profile of lead and a concave distribution profile of potassium along a radial direction. The gel was sintered to obtain a transparent glass having no cracks.

EXAMPLE 13

Figure 11:
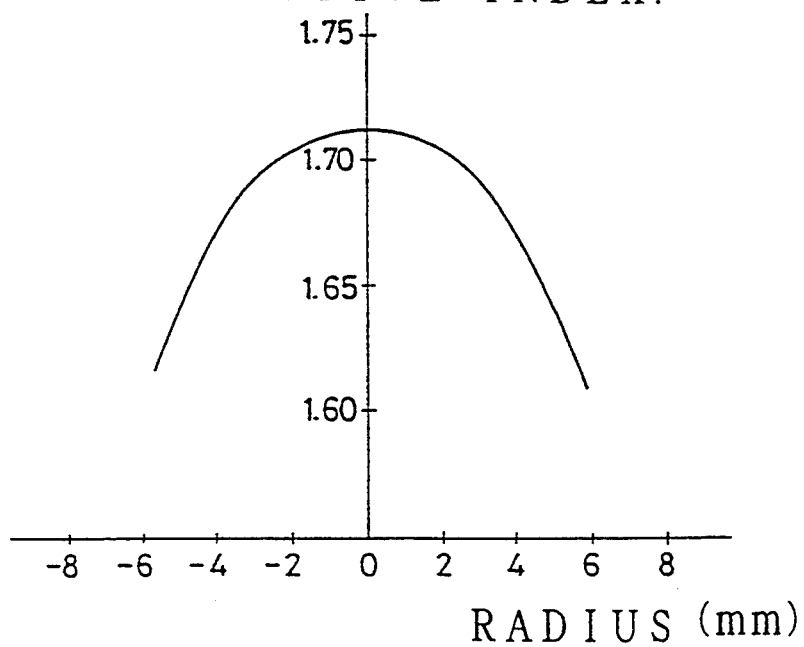
FIG. 11 shows the refractive index distribution, along a radial direction, of the glass manufactured in Example 13.

30 ml of TMOS, 30 ml of TEOS and 12.4 ml of triethyl borate were mixed together, and 25 ml of a 1/100N aqueous hydrochloric acid solution was added. The mixture was stirred at room temperature for 1 hr to effect partial hydrolysis. Then, a mixture of 107.6 ml of a 1.25 mol/liter aqueous lead acetate solution and 15.4 ml of acetic acid was added, vigorously stirred at room temperature, and transferred to a polytetrafluoroethylene container having a diameter of 30 mm. Gelation was conducted, and the gel was aged in a thermostatic drying oven set at 30° C. for 5 days and immersed at 60° C. in a 0.61 mol/liter lead acetate solution in a solvent comprised of IPA and water at a ratio of 8:2 to remove acetic acid and age the gel. The resultant gel was successively immersed in IPA, a 8:2 IPA/acetone solution, a 5:5 IPA/acetone solution and acetone each for two days to precipitate and fix microcrystals of lead acetate in the pores of the gel. The resultant homogeneous gel was immersed in 150 ml of an ethanol solution having 0.305 mol/liter potassium acetate and 0.153 mol/liter acetic acid dissolved therein for 8 hr to bring about a distribution. The resultant gel was successively immersed in a 5:5 IPA/acetone solution, acetone and acetone each for two days to precipitate and fix microcrystals of lead and potassium acetates in the pores of the gel. After the immersion, the gel was dried at 30° C. for 5 days, and sintered at temperatures elevated up to 570° C. to obtain a colorless, transparent glass of 11.4 mm in diameter having no cracks. Investigation of the refractive index distribution of the glass along a radial direction showed that a gradient index optical element was obtained, exhibiting a refractive index of 1.712 in the center, a monotonous decline of refractive index from the center toward the periphery, no inflection point in the periphery and a $\Delta n$ value of 0.095 (FIG. 11).

COMPARATIVE EXAMPLE 5

Figure 12:
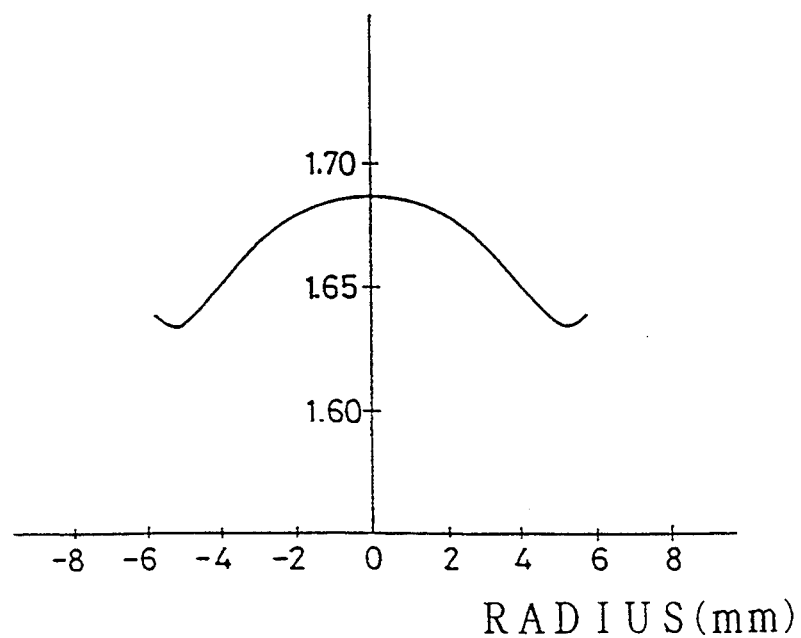
FIG. 12 shows the refractive index distribution, along a radial direction, of the glass manufactured in Comparative Example 5.

A gel was produced in substantially the same manner as in Example 13, and immersed in an ethanol solution having 0.305 mol/liter potassium acetate dissolved therein for 8 hr to provide a distribution. The resultant gel was treated, dried and sintered in substantially the same manner as in Example 13 to obtain a glass. The refractive index distribution of the glass along a radial direction was measured to obtain a profile of FIG. 12, exhibiting a refractive index as low as 1.686 in the center, an inflection point in the periphery and a/$\Delta n$ value as small as 0.052.

EXAMPLE 14

10 ml of methanol was added to 10.4 ml of TMOS, and stirred until a homogeneous mixture was obtained. 5.2 ml of a 1/100N aqueous hydrochloric acid solution was added to effect partial hydrolysis. After completion of heat liberation, 100 ml of a 0.3 mol/liter aqueous barium nitrate solution was added, stirred, transferred to a polypropylene container having a diameter of 36 mm, and allowed to stand still at room temperature. Thus, an opal, transparent gel was obtained. The gel was aged in a thermostatic oven set at 30° C. for a week.

The resultant gel was successively immersed in methanol, a 5:5 methanol/ethanol solution, ethanol and acetone each for two days to precipitate and fix microcrystals of barium nitrate in the skeleton of the gel.

The resultant gel was immersed in an ethanol solution having 0.6 mol/liter potassium nitrate and 0.3 mol/liter nitric acid dissolved therein for 8 hr to bring about a convex distribution profile of barium and a concave distribution profile of potassium. The resultant gel was successively immersed in IPA, a 5:5 IPA/acetone solution and acetone each for two days to fix the distribution profiles of the metal salts. After the immersion, the gel was dried in a thermostatic oven set at 30° C., and sintered to obtain a transparent glass of 12 mm in diameter having no cracks on the surface thereof. Investigation of the refractive index distribution of the glass along a radial direction showed that a gradient index optical element was obtained, exhibiting a refractive index of 1.621 in the center, a monotonous decline of refractive index from the center toward the periphery, no inflection point in the periphery and a Δn value of 0.072.

COMPARATIVE EXAMPLE 6

A gel was produced in substantially the same manner as in Example 14, and immersed in an ethanol solution having 0.6 mol/liter potassium nitrate dissolved therein for 8 hr to provide a distribution. The resultant gel was dried and sintered to obtain a glass. The refractive index distribution of the glass along a radial direction was measured to obtain a profile exhibiting a refractive index as low as 1.610 in the center, an inflection point in the periphery and a Δn value as small as 0.054.

EXAMPLE 15

A mixture of TMOS and TEOS was treated with a 1/100N aqueous hydrochloric acid solution to effect partial hydrolysis. Then, a 1 mol/liter aqueous lead propionate solution was added, vigorously stirred at room temperature, transferred to a polypropylene container having a diameter of 20 mm, and gelled. The gel was aged in a thermostatic oven set at 30° C. for 5 days.

Microcrystals of lead propionate were precipitated in the skeleton of the gel. The resultant gel was immersed in a methanol solution having 0.2 mol/liter sodium nitrate and 0.1 mol/liter propionic acid dissolved therein for 18 hr to bring about a distribution. For the gel, the distribution was fixed, and it was dried, and sintered to obtain a colorless, transparent glass of 7.2 mm in diameter.

Investigation of the refractive index distribution of the glass along a radial direction showed that a gradient index optical element was obtained, exhibiting a refractive index of 1.692 in the center, a monotonous decline of refractive index from the center toward the periphery, no inflection point in the periphery and a Δn value of 0.087.

EXAMPLE 16

TMOS and Ti(OnC$_4$H$_9$)$_4$ were treated with a 1/100N aqueous hydrochloric acid solution to effect partial hydrolysis. Then, a 0.3 mol/liter aqueous potassium nitrate solution was added, stirred at room temperature, transferred to a polypropylene container having a diameter of 12 mm, and gelled. The gel was aged in a thermostatic oven set at 30° C. for 5 days.

Microcrystals of potassium nitrate were precipitated in the skeleton of the gel. The resultant gel was immersed in a methanol solution having 0.6 mol/liter sodium acetate and 0.15 mol/liter acetic acid dissolved therein for 16 hr to bring about a distribution. For the gel, the distribution was fixed, and it was dried, and sintered to obtain a colorless, transparent glass of 4.3 mm in diameter.

Investigation of the refractive index distribution of the glass along a radial direction showed that a gradient index optical element was obtained, having a concave distribution profile exhibiting a refractive index of 1.621 in the center, a refractive index increase from the center toward the periphery and a Δn value of 0.052.

EXAMPLE 17

A mixture of TMOS and TEOS was treated with a 1/100N aqueous hydrochloric acid solution to effect partial hydrolysis. Then, a 0.3 mol/liter aqueous barium acetate solution was added, vigorously stirred at room temperature, transferred to a polypropylene container having a diameter of 20 mm, and gelled. The gel was aged in a thermostatic oven set at 30° C. for 5 days.

Microcrystals of barium acetate were precipitated in the skeleton of the gel. The resultant gel was immersed in an ethanol solution having 0.3 mol/liter lead acetate and 0.1 mol/liter acetic acid dissolved therein for 6 hr to bring about a distribution. The resultant gel was successively immersed in a 5:5 IPA/ethanol solution, IPA, a 5:5 IPA/acetone solution and acetone to fix barium and lead acetates.

Thereafter, further, the gel was immersed in an ethanol solution having 0.2 mol/liter potassium acetate and 0.1 mol/liter acetic acid dissolved therein for 6 hr to provide barium, lead and potassium with a convex, a concave and a concave distribution profile, respectively. The resultant gel was successively immersed in a 5:5 IPA/acetone solution, acetone and acetone to fix the distribution profiles of the metal salts. The thus obtained gel was dried, and sintered to obtain a glass.

Investigation of the refractive index distribution of the glass along a radial direction showed that a gradient index optical element was obtained, exhibiting a refractive index of 1.640 in the center, a monotonous decline of refractive index from the center toward the periphery, no inflection point in the periphery and a Δn value of 0.052.

EXAMPLE 18

A mixture of TMOS and TEOS was treated with a 1/100N aqueous hydrochloric acid solution to effect partial hydrolysis. Then, a 0.3 mol/liter aqueous barium acetate solution, a 0.25 mol/liter aqueous calcium acetate solution and a 0.48 mol/liter aqueous lead nitrate solution, were added, vigorously stirred at room temperature, transferred to a polypropylene container having a diameter of 12 mm, and gelled. The gel was aged in a thermostatic oven set at 30° C. for 5 days.

Microcrystals of barium and calcium acetates and lead nitrate were precipitated in the skeleton of the gel. The resultant gel was immersed in an ethanol solution having 0.15 mol/liter sodium nitrate and 0.3 mol/liter acetic acid dissolved therein for 4 hr to provide barium, calcium, lead and sodium with a convex, a convex, a convex and a concave distribution profile, respectively. The concentration distributions of the metal salts were fixed, and the gel was dried and sintered to obtain a transparent glass of 6 mm in diameter.

Here, acetic acid was used as an anion generator in the distribution-providing liquid, and only the acetates, among the various metal salts, were selectively fixed.

Investigation of the refractive index distribution of the glass along a radial direction showed that a gradient index optical element was obtained, exhibiting a refractive index of 1.713 in the center, a monotonous decline of refractive index from the center toward the periphery, no inflection point in the periphery and a XΔn value of 0.063.

The composition distribution of the glass along a radial direction was analyzed with respect to each of the metals. Each of the concentration distributions of barium and calcium exhibited a monotonous decline from the center toward the periphery, and was parabolic with no inflection point in the periphery. On the other hand, the distribution of lead exhibited a small gradient and a concentration difference between the center and the periphery as small as 3 mol %, and had an inflection point in the periphery.

COMPARATIVE EXAMPLE 7

A gel was produced in substantially the same manner as in Example 18, and the metal components were fixed. Then, the gel was immersed in an ethanol solution having 0.15 mol/liter sodium nitrate dissolved therein for 4 hr to provide a distribution. The subsequent procedure was performed in the same manner as in Example 18 to obtain a glass of 6 mm in diameter. The refractive index distribution of the glass along a radial direction was measured to obtain a profile exhibiting a refractive index of 1.692 in the center, and a $\Delta n$ value as small as 0.038 with an inflection point in the periphery.

The composition distribution of the glass along a radial direction was analyzed, and it was found that all of barium, calcium and lead exhibited a composition distribution profile having an inflection point in the periphery.

In the descriptive portion and the embodiments of the present specification, sintering is performed for manufacturing a multi-component glass. The sintering for rendering a porous body non-porous is not always required, depending on the use thereof. A porous glass can also be manufactured fully in accordance with the principle and concept of the present invention as set forth above. The elements which can be employed in the present invention are not limited to those mentioned in the Examples, and, in principle, any elements may be employed as long as they ensure satisfactorily small acid dissociation constants for metal ions and anions.

What is claimed is:

1. A method for manufacturing a glass element by converting a porous body into a multi-component glass element, comprising the steps of: providing a porous body containing a metal salt having one metal component; immersing the porous body in a solution containing one compound selected from the group consisting of an acid, an ammonium salt and an alkylammonium salt to precipitate the metal salt as microcrystals in the pores of the porous body; and drying and sintering the porous body to obtain a glass element.

2. A method for manufacturing a glass element according to claim 1; wherein the compound has the same anion as that of said metal salt contained in the porous body.

3. A method for manufacturing a glass element for use as a gradient index optical element, by converting a porous body into a multi-component glass, comprising the steps of: providing a porous body containing a metal salt having a first metal component; immersing the porous body in a solution containing a salt having a second metal component which is different from the first metal component and one compound selected from the group consisting of an acid and a salt including a cation having no influence on refractive index of a final glass element to provide the porous body with a concentration distribution; drying the porous body; and sintering the porous body to obtain a multi-component glass element useful as a gradient index optical element.

4. A method for manufacturing a glass component according to claim 3; wherein the compound is selected from the group consisting of an acid, an ammonium salt, an alkylammonium salt and an aluminum salt.

5. A method for manufacturing a glass element according to claim 4; wherein the compound has the same anion as that of the metal salt contained in the porous body.

6. A method for manufacturing a glass element according to claim 5; wherein all of the metal salt contained in the porous body, the compound and the salt having the second metal component have the same anion.

7. A method for manufacturing a glass element according to claim 6; wherein the compound has an anion selected from the group consisting of a formate ion, an acetate ion, a propionate ion, a citrate ion, a malate ion, a maleate ion, an oxalate ion, a lactate ion, a chloride ion, a nitrate ion, a sulfate ion, a carbonate ion, a phosphate ion and a borate ion.

8. A method for manufacturing a glass element according to claim 7; wherein the concentration of the said compound in the solution is varied with time.

9. A method for manufacturing a glass element according to claim 6; wherein the concentration of the compound in the solution is varied with time.

10. A method for manufacturing a glass element according to claim 5; wherein the compound has an anion selected from the group consisting of a formate ion, an acetate ion, a propionate ion, a citrate ion, a malate ion, a maleate ion, an oxalate ion, a lactate ion, a chloride ion, a nitrate ion, a sulfate ion, a carbonate ion, a phosphate ion and a borate ion.

11. A method for manufacturing a glass element according to claim 10; wherein the concentration of the compound in the solution is varied with time.

12. A method for manufacturing a glass element according to claim 5; wherein the concentration of compound in the solution is varied with time.

13. A method for manufacturing a glass element according to any one of claims 1 to 3, and 4; wherein the compound has an anion selected from the group consisting of a formate ion, an acetate ion, a propionate ion, a citrate ion, a malate ion, a maleate ion, an oxalate ion, a lactate ion, a chloride ion, a nitrate ion, a sulfate ion, a carbonate ion, a phosphate ion and a borate ion.

14. A method for manufacturing a glass element according to claim 13; wherein the concentration of the compound in the solution is varied with time.

15. A method for manufacturing a glass element according to any one of claims 1 to 3 and 4; wherein the concentration of the compound in the solution is varied with time.

16. A method for manufacturing a glass element comprising the steps of: providing a porous body containing a metal salt having a metal component; immersing the porous body containing the metal component in an immersion solution containing at least one compound selected from the group consisting of an acid, an ammonium salt and an alkylammonium salt effective to precipitate the metal salt in the pores of the porous body; drying the porous body; and sintering the porous body to obtain a glass element.

17. A method for manufacturing a glass element according to claim 16; wherein the at least one compound in the immersion solution produces the same anion as that produced by the metal salt contained in the porous body.

18. A method for manufacturing a glass element according to claim 16; wherein the at least one compound in the immersion solution produces the same cation as that produced by the metal salt contained in the porous body.

19. A method for manufacturing a glass element comprising the steps of: providing a porous body containing a first metal salt having a first metal component; immersing the porous body in a solution containing a second metal salt having a second metal component which is different from the first metal component and at least one compound selected from the group consisting of an acid and a salt, the at least one compound producing a cation having no influence on the optical properties of the glass element and effective to provide the porous body with a desired concentration distribution; drying the porous body; and sintering the porous body to obtain a multi-component glass element useful as a gradient index optical element.

20. A method for manufacturing a glass element according to claim 19; wherein the at least one compound is selected from the group consisting of an acid, an ammonium salt, an alkylammonium salt and an aluminum salt.

21. A method for manufacturing a glass element according to claim 19; wherein the at least one compound produces the same anion as that produced by the metal salt contained in the porous body.

22. A method for manufacturing a glass element according to claim 19; wherein each of the first metal salt contained in the porous body, the at least one compound and the second metal salt produce the same anion.

* * * * *